(12) United States Patent
Mori (10) Patent No.: US 8,880,878 B2
(45) Date of Patent: Nov. 4, 2014

(54) CONTENT DISTRIBUTION STORAGE SYSTEM, METHOD FOR OBTAINING CONTENT, NODE DEVICE, AND COMPUTER READABLE MEDIUM

(75) Inventor: Takafumi Mori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1135 days.

(21) Appl. No.: 12/606,511

(22) Filed: Oct. 27, 2009

(65) Prior Publication Data

US 2010/0106968 A1 Apr. 29, 2010

(30) Foreign Application Priority Data

Oct. 27, 2008 (JP) ................................. 2008-275854

(51) Int. Cl.
H04L 29/06 (2006.01)
H04L 12/28 (2006.01)
G06F 15/173 (2006.01)

(52) U.S. Cl.
CPC ............ H04L 63/0823 (2013.01); H04L 63/12 (2013.01)
USPC ............................ 713/158; 370/254; 709/243

(58) Field of Classification Search
USPC ........................................... 713/10, 176, 158
See application file for complete search history.

(56) References Cited

U.S. PATENT DOCUMENTS

| | | | | |
|---|---|---|---|---|
| 7,073,073 B1 * | 7/2006 | Nonaka et al. | ............... | 713/193 |
| 7,574,602 B2 * | 8/2009 | Isozaki et al. | ................ | 713/168 |
| 7,599,970 B2 * | 10/2009 | Meller et al. | ............................ | 1/1 |
| 7,886,159 B2 * | 2/2011 | Nonaka et al. | ................ | 713/193 |
| 2002/0152387 A1 * | 10/2002 | Asano | ............................ | 713/176 |
| 2003/0233549 A1 * | 12/2003 | Hatakeyama et al. | ......... | 713/170 |
| 2006/0005259 A1 * | 1/2006 | Isozaki et al. | .................... | 726/27 |
| 2006/0271794 A1 * | 11/2006 | Nonaka et al. | ................ | 713/193 |
| 2007/0100768 A1 * | 5/2007 | Boccon-Gibod et al. | ........ | 705/59 |
| 2007/0186111 A1 * | 8/2007 | Durand | ......................... | 713/176 |
| 2007/0234046 A1 * | 10/2007 | Ishiyama | ...................... | 713/158 |
| 2007/0283043 A1 * | 12/2007 | Kiyohara et al. | .............. | 709/243 |
| 2008/0144636 A1 | 6/2008 | Ushiyama et al. | | |
| 2008/0215701 A1 * | 9/2008 | Holt | ............................... | 709/213 |

FOREIGN PATENT DOCUMENTS

| | | | | |
|---|---|---|---|---|
| JP | 2002342516 A | * 11/2002 | .............. | G06F 17/60 |
| JP | A-2002-342516 | 11/2002 | | |
| JP | A-2006-197400 | 7/2006 | | |
| JP | A-2007-53662 | 3/2007 | | |

* cited by examiner

Primary Examiner — Krista Zele
Assistant Examiner — Margishi Desai
(74) Attorney, Agent, or Firm — Oliff PLC (57) ABSTRACT

A content distribution storage system includes: a first transmission unit configured to transmit a special content including certificate revocation list information indicating a list of at least an invalid electronic certificate to a first node group; a second transmission unit configured to transmit identification information for identifying the special content to a second node group; and a first node device. The first node device includes: a certificate obtaining unit configured to obtain the electronic certificate; an identification information obtaining unit configured, based on the obtained electronic certificate, to obtain the identification information of the special content comprising the certificate revocation list information corresponding to the obtained electronic certificate obtained; and a special content obtaining unit configured to obtain the special content from at least one node device of the first node group which stores the special content associated with the obtained identification information.

16 Claims, 8 Drawing Sheets

CONTENT DISTRIBUTION STORAGE SYSTEM, METHOD FOR OBTAINING CONTENT, NODE DEVICE, AND COMPUTER READABLE MEDIUM

CROSS-REFERENCE TO RELATED APPLICATIONS

This application claims priority from Japanese Patent Application No. 2008-275854 filed on Oct. 27, 2008, the entire contents of which are incorporated herein by reference.

TECHNICAL FIELD

The present invention relates to a technical field for obtaining a certificate revocation list used for determining the validity of an electronic certificate via a network.

BACKGROUND

The communication using an electronic certificate between information processing devices connected via a network requires a certificate revocation list (hereinafter referred to as a "CRL"). The CRL is a list for determining whether the electronic certificate is valid when an authentication using the electronic certificate is performed for communication. An example of a method for obtaining the certificate revocation list (hereinafter called a "CRL") includes the following processes. At first, the certificate revocation list is registered and stored in a server managed by a certificate authority which has issued the electronic certificate. That is, this method uses a client-server system in which the certificate revocation list is stored in a server and published to the client device. The client device accesses the server when necessary, thereby obtaining the certificate revocation list published to the public.

SUMMARY

However, the above-described method using the client-sever system is likely to involve a large number of accesses to a server of the certificate authority, which causes a high server load. Further, as an operating period of a network system requiring authentication using electronic certificates increases, the data size of a CRL also increases. Therefore, the server load resulting from a delivery of CRL increases caused by the increase of the data size.

The present invention was made in consideration of the above-described circumstances, and an object thereof is to provide a content distribution storage system, a method for obtaining a content, a node device, and a node processing program, which can lower the server load resulting from delivery of the certificate revocation list.

According to a first aspect of the invention, there is provided a content distribution storage system in which a plurality of node devices are connected via a network and are capable of transmitting and receiving a content to and from one another, said system comprising: a first transmission unit configured to transmit a special content to a first node group comprising one or more node devices of the plurality of node devices, the special content comprising certificate revocation list information indicating a list of at least an invalid electronic certificate; a second transmission unit configured to transmit identification information for identifying the special content to a second node group comprising one or more second node devices of the plurality of node devices; a first node device that comprises: a certificate obtaining unit configured to obtain the electronic certificate; an identification information obtaining unit configured, based on the electronic certificate obtained by the certificate obtaining unit, to obtain the identification information of the special content comprising the certificate revocation list information corresponding to the electronic certificate obtained by the certificate obtaining unit; and a special content obtaining unit configured to obtain the special content from at least one node device of the first node group which stores the special content associated with the identification information obtained by the identification information obtaining unit.

According to a second aspect of the invention, there is provided a node device connected to a plurality of other node devices via a network and capable of transmitting and receiving a content to and from the plurality of other node devices in a content distribution storage system, said node device comprising: a certificate obtaining unit configured to obtain the electronic certificate; an identification information obtaining unit configured, based on the electronic certificate obtained by the certificate obtaining unit, to obtain identification information of a special content comprising certificate revocation list information corresponding to the electronic certificate obtained by the certificate obtaining unit, from at least one node device of a first node group, the first node group comprising one or more node devices of the plurality of other node devices which store the identification information; and a special content obtaining unit configured to obtain the special content from at least one node device of a second node group, the second node group comprising one or more node devices of the plurality of other node devices which store the special content associated with the identification information obtained by the identification information obtaining unit.

According to a third aspect of the invention, there is provided a computer-readable medium having a computer program stored thereon and readable by a computer, said computer program, when executed by the computer contained in a node device connected to a plurality of other node devices via a network and capable of transmitting and receiving a content to and from the plurality of other node devices in a content distribution storage system, causes the computer to perform operations comprising: obtaining an electronic certificate; obtaining, based on the obtained electronic certificate, identification information of a special content comprising certificate revocation list information corresponding to the obtained electronic certificate, from at least one node device of a first node group, the first node group comprising one or more node devices of the plurality of other node devices which store the identification information; and obtaining the special content from at least one node device of a second node group, the second node group comprising one or more node devices of the plurality of other node devices which store the special content associated with the obtained identification information obtained.

According to a fourth aspect of the invention, there is provided A method for obtaining a content in a content distribution storage system in which a plurality of node devices are connected via a network and are capable of transmitting and receiving a content to and from one another, said method comprising: transmitting a special content from a first transmission unit to a first node group comprising one or more node devices of the plurality of node devices, the special content comprising certificate revocation list information indicating a list of at least an invalid electronic certificate; transmitting identification information for identifying the special content from a second transmission unit to a second node group comprising one or more second node devices of the plurality of node devices; obtaining the electronic certificate by a first node device; obtaining, based on the obtained electronic certificate, the identification information of the special content comprising the certificate revocation list information corresponding to the obtained electronic certificate, by the first node device; and obtaining the special content by the first node device from at least one node device of the first node group which stores the special content associated with the obtained identification information.

DESCRIPTION

Hereinafter, exemplary embodiments of the present invention will be described with reference to the drawings. In the exemplary embodiments, a case in which the present invention is applied to a content distribution storage system is described.

(1. First Exemplary Embodiment)
(1.1 Brief Configuration and Operation of Content Distribution Storage System)

At first, the brief configuration and operation of a content distribution storage system according to a first exemplary embodiment will be described with reference to FIG. 1.

Figure 1:
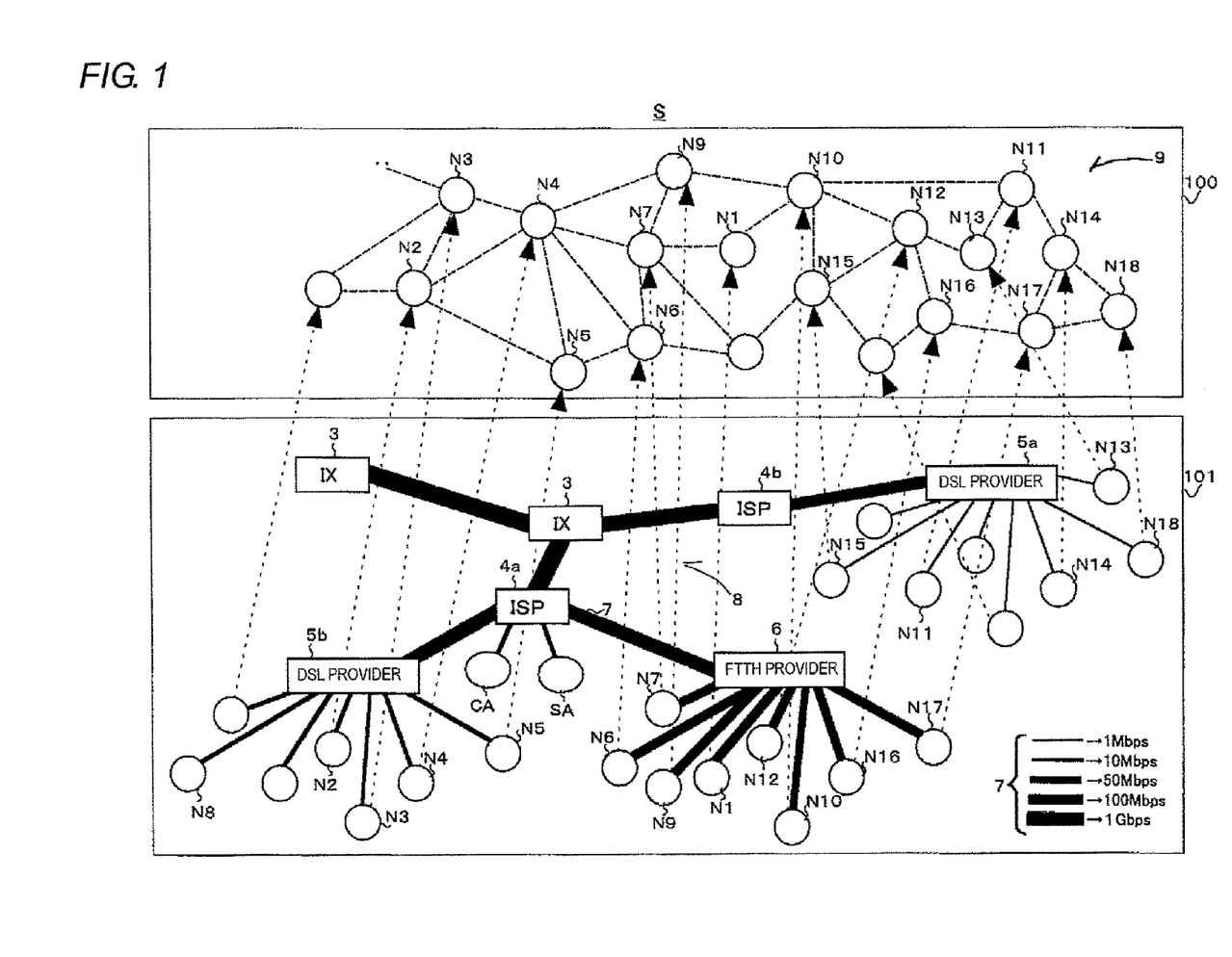
FIG. 1 shows an example of connecting status of each of node devices in the content distribution storage system according to the first exemplary embodiment.

As shown in a lower frame 101 of FIG. 1, a network 8 such as the Internet includes an internet exchange (IX) 3, internet service providers (ISPs) 4a and 4b, (devices of) digital subscriber line) providers (DSL) 5a and 5b, (a device of) a fiber to the home provider (FTTH) 6, and a communication line (e.g., a telephone line, an optical cable, and the like) 7. Although not shown, routers for transferring data or packets are inserted in the network 8 of the example shown in FIG. 1 as necessary.

A plurality of node devices Nn (n=1, 2, 3, ...) are connected to the network 8. The node device is also referred to as "node." Each of the nodes Nn is assigned a unique manufacturing number and an IP (Internet Protocol) address.

As shown in an upper frame 100 of FIG. 1, a content distribution storage system S of this exemplary embodiment is a peer-to-peer network system. The peer-to-peer network system is made by connecting any plurality of nodes Nn of the nodes Nn. In this exemplary embodiment, a connection of a node Nn to the peer-to-peer network is referred to as "a participation in the peer-to-peer network."

A network 9 provided in the upper frame 100 shown in FIG. 1 is an overlay network 9 configuring a virtual link made by a use of an existing network 8. That is, the overlay network 9 is a logical network. The overlay network 9 is implemented by a specific algorithm, for example, an algorithm utilizing a distributed hash table (hereinafter referred to as DHT). Each of the nodes Nn participating in the overlay network 9, i.e., the content distribution storage system S, is assigned a node ID as identification information containing a given number (e.g., predetermined number) of digits. The identification information may be unique to each of the node Nn.

For example, the node ID is a hash value obtained by hashing a unique number assigned to each of the nodes Nn such as an IP address or a manufacturing number by a common Hash function. The Hash function is an SHA-1, or the like. The hashed value has a bit length of 160 bits. The node IDs are uniformly distributed in a single ID space.

A node Nn which has not yet participated in the system can participate in content distribution storage system S by transmitting a participation message indicating a participation request to an arbitrary node Nn which has already participated in the system. The arbitrary node Nn that has already participated in the content distribution storage system S is, for example, a contact node. The contact node is a node Nn which always participates in the content distribution storage system S.

Each of the nodes Nn holds a routing table using the DHT. The routing table specifies destinations of respective messages in the content distribution storage system S. Specifically, a node Nn which is appropriately spaced in an ID space is determined. A plurality of sets of node information are registered in the routing table. Each of the sets of node information includes a node ID Nn, an IP address, and a port number of the determined node.

One node Nn participating in the content distribution storage system S registers node information about the minimum required nodes Nn in the routing table. When a message is transmitted to a node Nn whose node information is not registered in the routing table, various messages are transferred among nodes Nn, to thus deliver the message.

An example of the routing table using such the DHT is described, for example, in US Patent Application Publication No. 2007/0283043 A1, the entire contents of which are incorporated herein by reference.

As described in US Patent Application Publication No. 2007/0283043 A1, the content distribution storage system S stores replicas in a plurality of nodes Nn in a distributed manner. Replicas are sets of data corresponding to replication of various contents of different substances (e.g., a movie, music, and the like). Replicas are stored in a given (e.g., predetermined) file format. A single content may be divided to a plurality of subdivided contents, and a plurality of replicas of the respective subdivided contents may be stored in the plurality of nodes Nn, respectively.

Each of the replicas is available among the nodes Nn. For example, a node N5 stores a replica of a content about a movie having a title XXX, whilst a node N3 stores a replica of a content about a movie having a title YYY. As described above, the replicas are stored in the plurality of nodes Nn in a distributed manner. A node Nn storing a replica is hereinafter referred to as a "content-holding node."

Information, such as a content name (title) and a content ID (unique identification information for each content), is added to each of the replica of the content. The content ID is generated, for example, by hashing a content name and an arbitrary numeral by a Hash function. The Hash function used herein is the Hash function common to the Hash function for obtaining the node ID. The generated content ID is arranged in the same ID space where the node ID belongs. An arbitrary numeral is, for example, several first bytes of content data. Alternatively, a system manager may give a unique ID value to each content. The content ID to be given has the same bit length as that of the node ID. In this case, content catalogue information is delivered to all of the nodes Nn. The content catalogue information is information including a correspondence between a content name and a content ID.

Locations of the replicas of the contents stored in the distributed manner are stored and managed by one or more nodes Nn, or the like, that manages locations of the replicas of the contents.

In the exemplary embodiment, information including a combination of node information about a node Nn storing the replica of the content and the content ID of the corresponding content is taken as index information. A node Nn that manages the location of the replica of the content is referred to as a "root node" or a "root node of content or content ID." The index information is stored in and managed by the root node. The index information is stored in an index cache.

For example, the index information about the replica of the content of the movie having the title XXX is managed by a node N4 operating as the root node of content or content ID. The index information about the replica of the content of the movie having the title YYY is managed by a node N7 operating as the root node of content or content ID. The root node is determined, for instance example, as a node Nn having a node ID closest to the content ID. For example, a node Nn having a node ID that includes a larger number of matches in connection with high order digits is determined as the root node.

It is assumed that a user of a certain node Nn desires to obtain a replica of a desired content. The node Nn that desires to obtain the replica is referred to as a "user node." The user node generates a content location query message. The content location query message includes a content ID of the content selected by the user and an IP address of the user node. The content location query message is also referred to a query. The content location query message is transmitted to another node Nn in accordance with the routing table using the DHT of the user node. Specifically, the user node transmits the content location query message toward the root node. That is, the content location query message is transmitted to the root node as a destination of the message. As a result, the content location query message finally arrives at the root node by DHT routing that uses the content ID as a key.

Attribute information about a content, such as a content name and a content ID, is described in content catalogue information. The user of each node Nn selects a content in accordance with the content catalogue information. The content catalogue information is delivered to all of the nodes Nn, for example, from a center server SA.

The content ID included in the content location query message may also be generated by hashing a content name by the user node through use of the common Hash function. An example of DHT routing is described, for example, in US Patent Application Publication No. 2007/0283043 A1, and hence its detailed explanation is omitted.

The root node that has received the content location query (search) message obtains index information corresponding to the content ID included in the message from the index cache. The obtained index information is returned to the user node that is a source of the content location query message. The user node that has obtained the index information accesses the content-holding node in accordance with an IP address, or the like, of the content-holding node included in the index information. Then, the user node transmits a content transmission request message to the content-holding node. Consequently, the user node becomes possible to download the replica of the content from the content-holding node. The index information may include node information, for example, about a plurality of content-holding nodes. Specifically, in this case, replicas of a single (same) content are held in a plurality of content-holding nodes. In such a case, the user node selects one from the plurality of content-holding nodes. The user node establishes a connection with the selected content-holding node and downloads the replica of the content.

The user node may download the replica from the content-holding node by transmitting a content transmission request message from the root node to the content-holding node indicated by an IP address, or the like, included in the index information. The user node may obtain the index information from a cache node that caches the same index information as that cached by the root node, in a period (path) during which the content location query message arrives at the root node.

The user node storing the replica of the content obtained from the content holding node notifies the root node of storage of the replica. Specifically, in order to notify the root node of storage of the replica, publish message including the content ID of the replica and node information about the user node is generated. The publish message is a notice of registration of a content. The user node transmits the publish message toward the root node. As in the case with the content location query (search) message, the publish message arrives at the root node by the DHT routing using the content ID as a key. The root node stores the index information included in the received publish message in registration index cache. The index information included in the message includes a set containing the node information and the content ID. Thus, the user node newly acts as a content-holding node that holds the replica of the content.

Incidentally, when nodes Nn communicate with each other, each of the nodes Nn performs mutual authentication for determining whether a node at the other end (hereinafter simply referred to as a "destination node") is a node that is permitted to participate in the content distribution storage system S. As used herein, the term "destination node" means a node Nn that acts as a destination party with which a certain node Nn communicates. A communication between the nodes Nn includes, for example, downloading of a replica of a content from a certain node Nn, and the like. Authentication is performed by use of an electronic certificate that the destination node is permitted to participate in the content distribution storage system S. Even when an expiry date put on the electronic certificate is not yet reached, there is a possibility that the electronic certificate will have expired for any reason. For this reason, the node Nn to perform authentication ascertains the validity of an electronic certificate by use of a CRL (certificate revocation list) corresponding to the electronic certificate used for the authentication.

A format of the electronic certificate and a format of the CRL are analogous to formats generally used. For example, the electronic certificate includes descriptions, such as a version of a certificate, a serial number, a signature algorithm, an identification name of an issuer, an expiry date of a certificate, a name of a certificate owner, a public key algorithm, a public key, an extended area, a signature algorithm, an owner's signature, and the like. For example, a CRL delivery point is provided in an extended area. The CRL includes descriptions, for example, a version of a CRL, a signature algorithm, an identification name of an issuer, a date and time for a current update, a date and time for a next update, a revoked certificate list, an extended area, a signature algorithm, an owner's signature, and the like. In this exemplary embodiment, the owner means a certificate authority or a manager of the content distribution storage system S.

The CRL is generated by an authentication server CA and periodically updated. The CRL generated by the authentication server CA is transmitted to a center server SA. The CRL is transmitted as a special content from the center server SA to a plurality of nodes Nn. The transmitted special content is also stored in a distributed manner in the plurality of nodes Nn as is the content. A node Nn requiring the CRL obtains a CRL as a special content in the same manner as in the case where the replica of the content is obtained.

(1.2 Center Server SA)

The configuration and function of the center server SA are now described with reference to FIG. 2.

Figure 2:
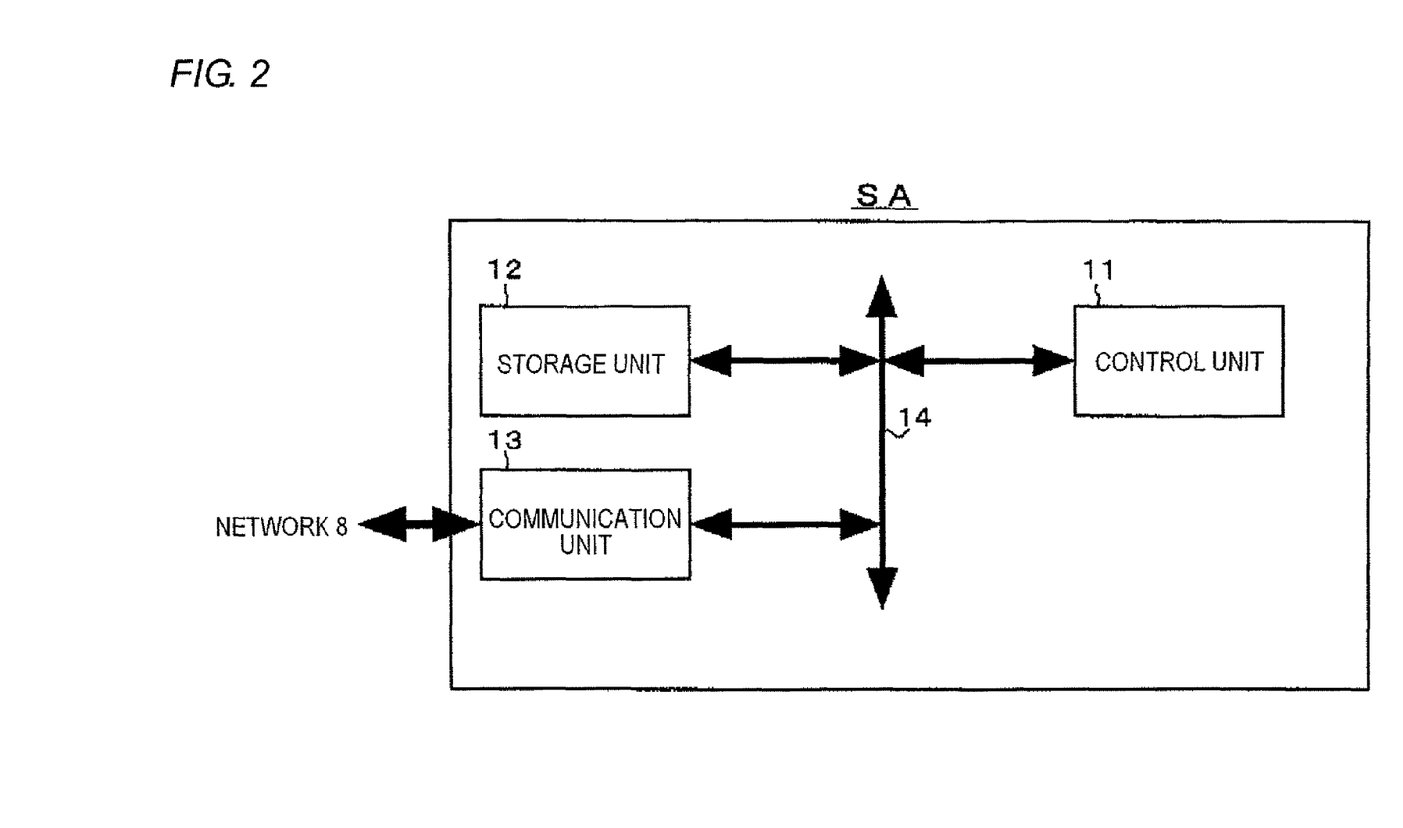
FIG. 2 is a view showing a general exemplified configuration of a center server.

As shown in FIG. 2, the center server SA includes a control unit 11, a storage unit 12, and a communication unit 13. The control unit 11, the storage unit 12, and the communication unit 13 are connected to one another via a bus 14. The control unit 11 includes a CPU having an operational function, working RAM, ROM for storing various types of data and programs, and the like. The storage unit 12 includes a hard disk drive (HD) for storing various types of data and various programs, and the like. The communication unit 13 controls communication of information between nodes Nn via the network 8, and the like.

Node IDs, IP address, and port numbers of respective nodes Nn are stored in the storage unit 12.

The control unit 11 performs centralized control of the entirety by the CPU reading and executing a program stored in the storage unit 12, and the like.

The control unit 11 obtains the CRL generated by the authentication server CA from the authentication server CA, and generates a single special content from each of the obtained CRLs. As in the case of distribution storage of the replica of the content, the control unit 11 transmits the special contents to a plurality of nodes Nn. Specifically, the control unit 11 issues a special content input command to the nodes Nn, thereby storing the special contents in the plurality of nodes Nn in a distributed manner.

The user node may download the special content from the center server SA, in stead of a mode in which the center server SA itself inputs the special content to the plurality of nodes Nn in the distributed manner. There is a case where, when the user node inquires of the root node about the location of a special content, the content-holding node which holds the special content is not registered in the root node. Specifically, there is a case where the node Nn storing the special content is not yet present. In this case, the user node downloads the special content from the center server SA. As described above, one node Nn requiring a CRL as a special content first obtains the special content from the center server SA, and then the node Nn is registered as a content-holding node in the root node. Therefore, another node Nn becomes able to obtain the special content from the content-holding node by the DHT routing. This is not limited to the special content, and the same is also applicable to an ordinary content.

A content ID (identification information) is assigned to a special content. The content ID may be unique to each of the contents. For example, the content ID is generated by hashing the CRL by the Hash function commonly used for the node Id. The content ID is arranged in the same ID space where the node IDs are provided. The content ID of the generated special content serves as a key for searching the special content by each of the nodes Nn. Accordingly, the content ID of the special content has to be reported to each of the nodes Nn. For example, a content ID of a special content is described in content catalogue information. The catalogue information is delivered to the nodes Nn, to thus be reported to the respective nodes Nn. consequently, the special content can thereby be obtained among other nodes Nn.

It is preferable to deliver the content catalogue information to all of the nodes Nn participating in the content distribution storage system S by a DHT multicasting. For example, the DHT multicasting may be a multicast message transfer processing described in US Patent Application Publication No. 2008/0144636 A1, the entire contents of which are incorporated herein by reference.

The updated CRL is periodically transmitted from the authentication server CA to the center server SA. The control unit 11 generates a special content from the updated CRL and inputs the special content to the plurality of nodes Nn in a distributed manner. Specifically, when the CRL included in the special content stored in the distributed manner is updated, a new special content including the updated CRL is stored in the plurality of nodes Nn in the distributed manner. In the same manner as described above, the user node may also download the special content from the center server SA rather than the center server SA itself inputting the special content to the plurality of nodes Nn in a distributed manner.

At this time, the updated new content is assigned a new content ID. Specifically, the new content ID is updated from a previously-assigned content ID. For this reason, the control unit 11 performs a content ID notification processing to each of the nodes Nn, so as to validate the new content ID of the newly-input special content in the content catalogue information. For example, the control unit 11 transmits, to the respective nodes Nn, a content ID notification message for making invalidating or expiring the content ID of the old special content and for validating the content ID of the new special content.

Alternatively, the control unit 11 may deliver, to the respective nodes Nn, content catalogue information including descriptions about the content ID of the new special content. The catalogue information to be delivered does not include any descriptions about content IDs of old special contents. As a result, it becomes impossible for other nodes Nn to obtain the old special contents.

Incidentally, a conceivable way to reduce the amount of communication traffic required to perform single downloading of the special content is that the authentication server CA generates CRLs in a split manner. For example, electronic certificates are generated while classified according to a range of certificates to be covered, such as a CRL 1 for electronic certificates serially numbered 0000 to 0999 and a CRL 2 for electronic certificates serially numbered 1000 to 1999. It is preferable that the center server SA may generate a special content on a per-CRL basis. Accordingly, each of the nodes Nn has to know a content ID of a special content including an up-to-date CRL which is necessitated by the node Nn.

The electronic certificate and the up-to-date content ID of the special content including a corresponding CRL are associated with each other by the CRL delivery point and the content catalogue information. The CRL delivery point is provided in the extended area of the electronic certificate.

For example, a keyword, an identification name, and/or the position of content ID to be described in the content catalogue information is provided as information corresponding to the content ID at the CRL delivery point of the electronic certificate. The keyword or the identification name is information for identifying the CRL corresponding to the electronic certificate. The content name and the content ID of a special content are set on the content catalogue information. The keyword is provided for the content name. Thus, the node Nn can search content catalogue information by the keyword provided at the CRL delivery point of the electronic certificate. An appropriate content ID can thereby be obtained.

Moreover, The content IDs of respective special contents in the content catalogue information may be described in a fixed order (fixed description positions). In this case, information showing locations where content IDs of special contents including corresponding CRLs are provided may be provided at the CRL delivery point of the electronic certificate.

(1.3 Node Nn)

The configuration and function of the node Nn is now described with reference to FIG. 3.

Figure 3:
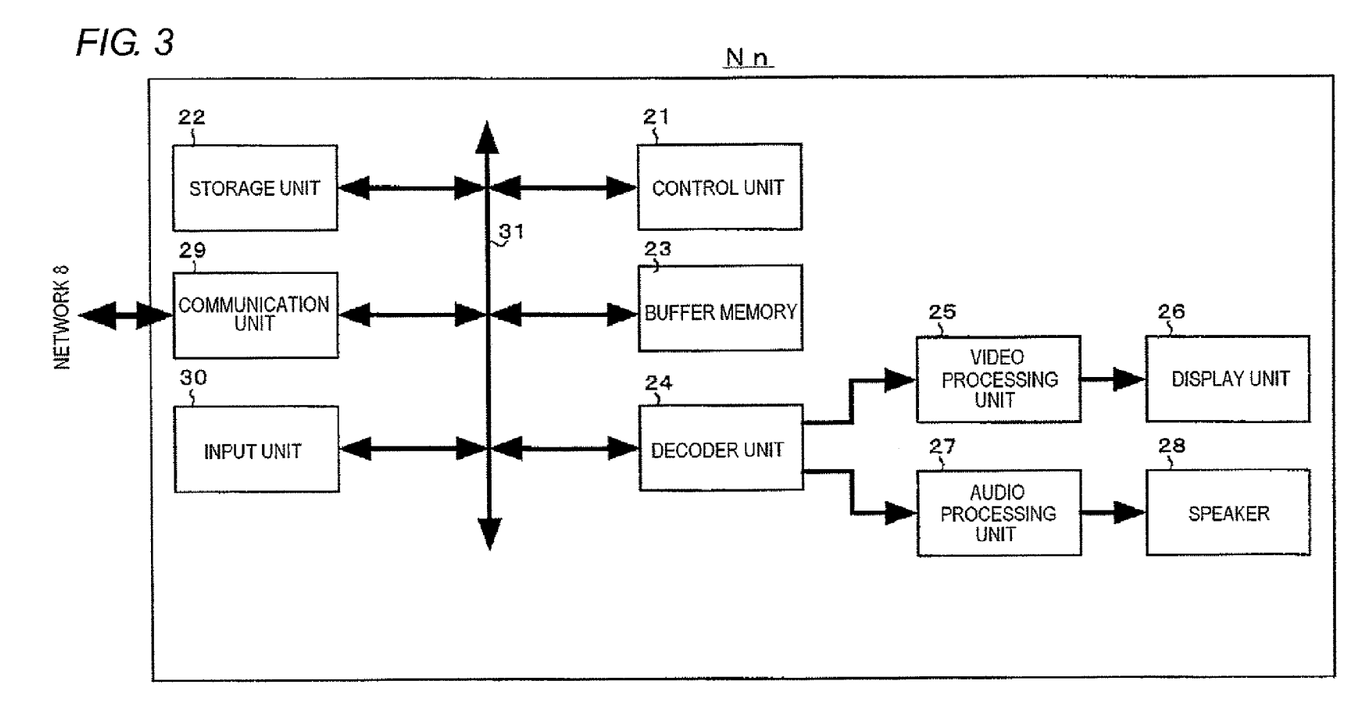
FIG. 3 is a view showing an exemplified general configuration of a node device.

As shown in FIG. 3, each of the nodes Nn includes a control unit 21, a storage unit 22, buffer memory 23, a decoder unit 24, a video processing unit 25, a display unit 26, an audio processing unit 27, a speaker 28, a communication unit 29, and an input unit 30. The control unit 21, the storage unit 22, the buffer memory 23, the decoder unit 24, the communication unit 29, and the input unit 30 are connected with one another via the bus 31. The control unit 21 is a computer including a CPU having an operational function, working RAM, ROM storing various sets of data and programs, and the like. The storage unit 22 includes a hard disk drive) (HD), and the like, for holding (storing) various sets of data and programs. The buffer memory 23 temporarily stores replicas of received contents, and the like. The decoder unit 24 decodes encoded video and audio data, and the like, included in the replica of the content. The term "decoding" means expansion and decryption of data, and the like. The video processing unit 25 subjects the decoded video data, and the like, to predetermined rendering and outputs the result as a video signal. The display unit 26 is a CRT, a liquid-crystal display, and the like, which displays a video in accordance with a video signal output from the video processing unit 25. The audio processing unit 27 converts the decoded audio data into an analogue audio signal through digital to analogue (D/A) conversion, amplifies the signal by use of an amplifier, and outputs the thus-amplified audio signal. The speaker 28 outputs, as sound waves, an audio signal output from the audio processing unit 27. The communication unit 29 controls communication of data with another node Nn, and the like, via the network 8. The input unit 30 receives a command from the user and gives a command signal to the control unit 21 in accordance with the command. The input unit 30 is, for example, a keyboard and mouse or a remote controller and operation panel, and the like. A personal computer, a Set top box (STB), a TV receiver, and the like, are applicable for the node Nn. The node Nn is disposed, for example, in a user's home, a Karaoke bar, a hotel, and the like.

The storage unit 22 stores: the routing table using the DHT; index information; content catalogue information; the IP address and port number of the contact node serving as a destination to be accessed when a node participates in the content distribution storage system S; and an IP address and port number, and the like, of the center server SA.

The storage unit 22 stores the electronic certificate verifying that own node is permitted to participate in the content distribution storage system S. The storage unit 22 also stores CRLs obtained in response to electronic certificates of other nodes Nn with which the own node communicated in the past. The electronic certificate may also be simultaneously installed, for example, along with a program for utilizing the content distribution storage system S. Alternatively, the electronic certificate may also be downloaded when a user has paid a service charge for the content distribution storage system S.

In the control unit 21, the CPU reads a program (including a node processing program) stored in the storage unit 22, and the like, and executes the read program. As a result of execution of the program, the entirety of the node is controlled in a centralized manner, whereby the control unit performs processing of at least any one of the user node, a relay node, the root node, the cache node, and the content-holding node. The relay node is a node for relaying data received from another node to yet another node. The control unit 21 is operable as an example of the identification information obtaining unit and the special content obtaining unit.

More specifically, when received a special content input command issued by the center server SA as mentioned above, the control unit 21 downloads the special content, for example, from the center server SA, and stores the thus-downloaded content in the storage unit 22. The user node may also download a special content from the center server SA when a content-holding node holding the special content is not registered in the root node rather than the center server SA itself inputting the special content in the plurality of nodes Nn in a distributed manner above. In this case, a function associated with receipt of a special content input command is not required.

When such a special content is stored, the control unit 21 generates a publish message including a content ID of the special content and node information about the own node. The control unit 21 transmits the publish message toward a root node (an example management device) that manages the location of the special content. The publish message arrives at a root node by DHT routing taking a content ID as a key. The control unit 11 of the root node registers index information including a set consisting of node information and a content ID which are included in a received publish message.

The root node managing the location of the special content is a node Nn associated with a content ID, for example, of a special content. For example, the root node is a node Nn having a node ID closest to the content ID of the special content. The node ID closest to the content ID of the special content is an ID having a larger number of matches in connection with high order digits.

Meanwhile, when requesting a connection with the other node Nn or received a connection request from the other node Nn in order to establish predetermined communication with the other node Nn, the control unit 21 authenticates the destination node. Specifically, the control unit 21 transmits to the destination node an electronic certificate of the own node, as well as receiving the electronic certificate of the other node transmitted from the node a the other end. Next, when a CRL corresponding to the thus-received electronic certificate stored in the storage unit 22 has expired, a content ID of a special content of a corresponding up-to-date CRL is obtained from the content catalogue information in accordance with the CRL delivery point of the electronic certificate. The control unit 21 sends a query toward the root node. Specifically, the control unit 21 sends a content location query message including the obtained content ID toward the root node. By the root node received the message, index information corresponding to the content ID included in the message is obtained from index cache. Specifically, the control unit 21 performs control operation in such a way that a content-holding node holding a special content assigned the obtained content ID is searched in accordance with the content ID. The user node thus obtained the index information accesses the content-holding node in accordance with an IP address, and the like, of a certain content-holding node included in the index information. The user node transmits a content transmission request message and downloads (obtains) a special content from the content-holding node. Procedures for searching and downloading the special content are the same as those employed when the replica of the content is downloaded.

The control unit 21 searches for a serial number of an electronic certificate from a revoked certificate list of a CRL included in the downloaded special content. The control unit 21 determines whether or not an electronic certificate has expired. When a result of determination shows that the electronic certificate has not expired, the control unit 21 allows establishment of a connection with the destination node. When the electronic certificate has expired, the control unit rejects a connection with the destination node. In accordance with a signature provided in an electronic certificate, the control unit 21 determines whether the electronic certificate is genuine or tampered. The foregoing determination is made, and another determination is also made, in accordance with a signature provided in the CRL, as to whether or not the CRL is genuine.

Figure 4:
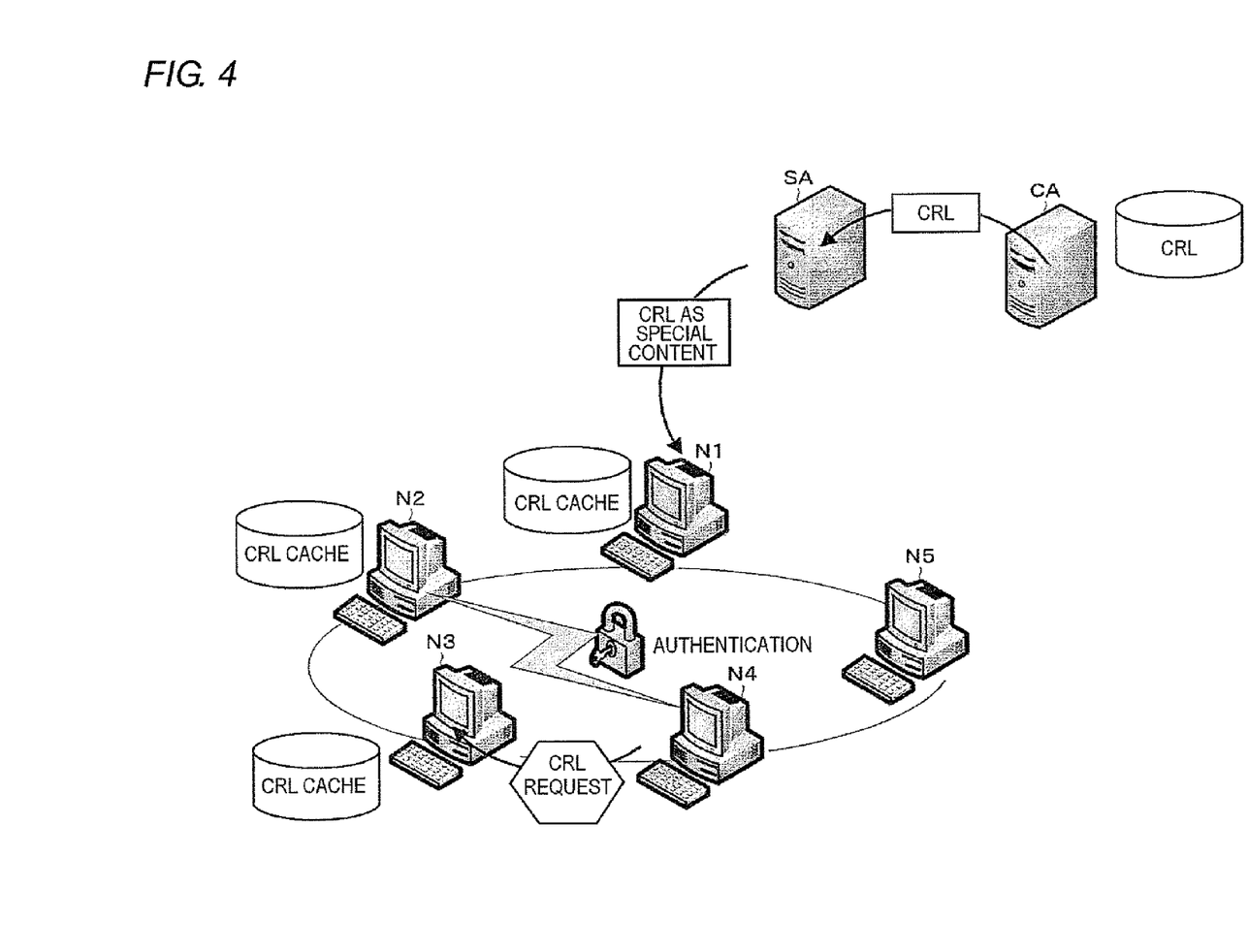
FIG. 4 is a view showing a manner of inputting and obtaining a special content and an example usage of a CRL included in the special content.

An example provided in FIG. 4 shows that a node N4 obtains a CRL from a node N3 when a node N2 and the node N4 perform mutual authentication.

The node processing program may also be downloaded from a predetermined server located, for example, in a network 8. For example, the node processing program may also be recorded in a recording medium, such as a CD-ROM, and read via a drive for the recording medium.

(1.4 Operation of the Content Distribution Storage System S)

Operation of the content distribution storage system S of this exemplary embodiment will now be described with reference to FIGS. 5 and 6. embodiment.

Figure 5:
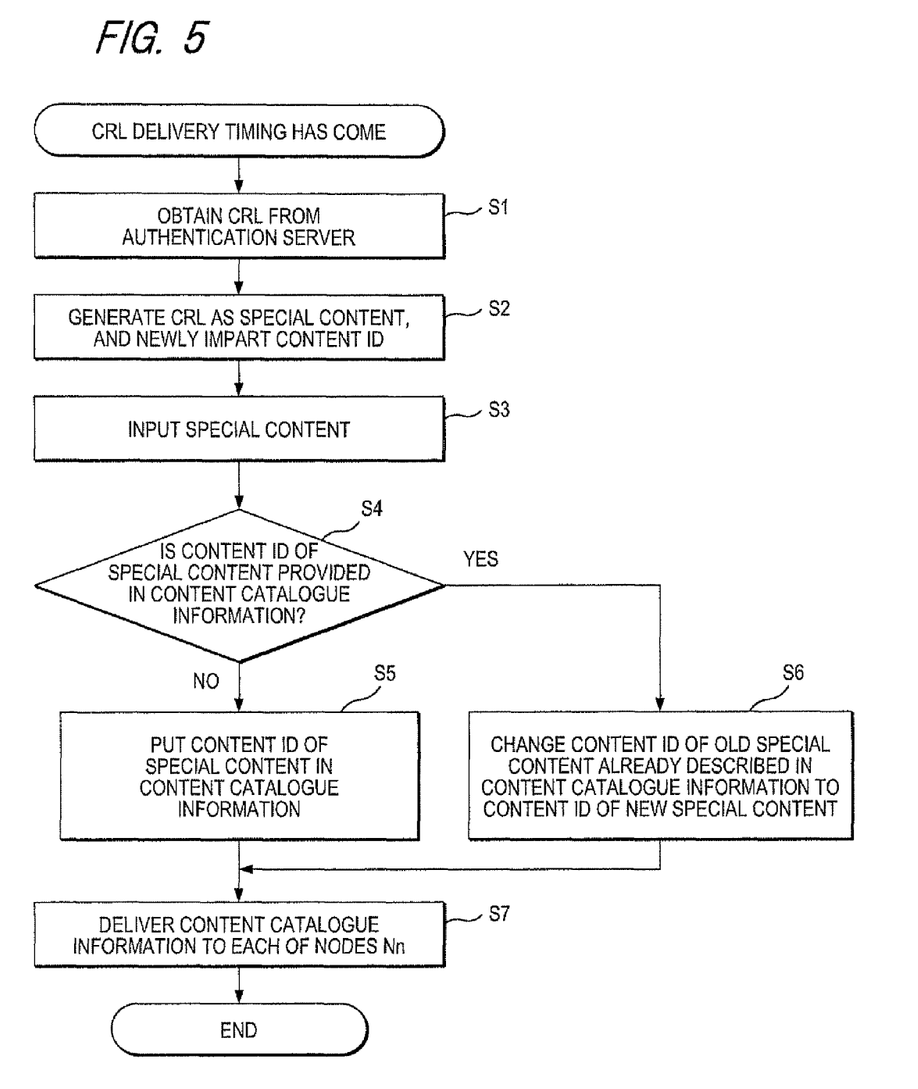
FIG. 5 is a flowchart showing example processing of a control unit in the center server of a first exemplary embodiment.

First, for example, the authentication server CA performs processing shown in FIG. 5 every time timing for delivering each of CRLs has come. As shown in FIG. 5, a new CRL or an update CRL is transmitted from the authentication server CA to the center server SA, and the control unit 11 of the center server SA obtains the CRL (step S1).

Next, the control unit 11 generates a CRL as a special content; generates a new content ID (a content ID differing from an existing content ID), and imparts the content ID to the special content (step S2).

Next, the control unit 11 randomly selects a plurality of (e.g., tens of) nodes Nn from the plurality of nodes Nn whose node data are managed by the center server SA. The control unit 11 inputs the thus-generated special content to the thus-selected respective nodes Nn (step S3).

The control unit 11 next determines whether or not the content ID of the special content is provided in the latest content catalogue information delivered to all of the nodes Nn (step S4). In other words, in step S4, the control unit 11 determines whether the content ID of the special content has been stored in the latest content catalogue information. When the content ID is not provided (NO in step S4), the control unit 11 proceeds to step S5. When the content ID is provided (YES in step S4), the control unit 11 proceeds to step S6.

The control unit 11 proceeded to step S5 puts the content ID of the generated special content in the content catalogue information. The CRL delivery point is provided in an extended area of the CRL. For example, in accordance with the serial number of the electronic certificate, a CRL delivery point, and the like, the control unit 11 provides a content name (keyword) of the special content in the content catalogue information. In this case, the serial number of an electronic signature is put in the revoked certificate list of the CRL. The control unit 11 may determine a position in content catalogue information where a content ID is to be provided in accordance with the CRL delivery point, and may describe (update) the content ID at the determined position in the content catalogue information.

Foregoing processing is intended for making it possible for the control unit 11 to enable each of the nodes Nn to search for an appropriate content ID.

Next, the control unit 11 delivers the content catalogue information to each of the nodes Nn (step S7), and completes processing. The control unit 11 may also be configured so as to transmit a content ID notification message including the content ID of the special content to each of the nodes Nn. According to the configuration, each of the nodes Nn received the content ID notification message puts the content ID of the special content in the already-stored content catalogue information, thereby making the content ID of the special content valid.

In the meantime, the control unit 11 proceeded to step S6 changes a content ID of an old special content already put in the content catalogue information to a content ID for a new special content. The control unit 11 delivers the content catalogue information to each of the nodes Nn (step S7). The control unit 11 completes processing. The control unit 11 may also be configured so as to make the content ID of the old special content invalid or expired and transmit to the respective nodes Nn a content ID notification message for making a content ID of a new special content valid. According to the configuration, each of the nodes Nn received the content ID notification message makes invalid the content ID of the old special content put in the already-stored content catalogue information. Each of the nodes Nn received the messages puts a content ID of a new special content in the content catalogue information, thereby rendering the content ID valid.

Figure 6:
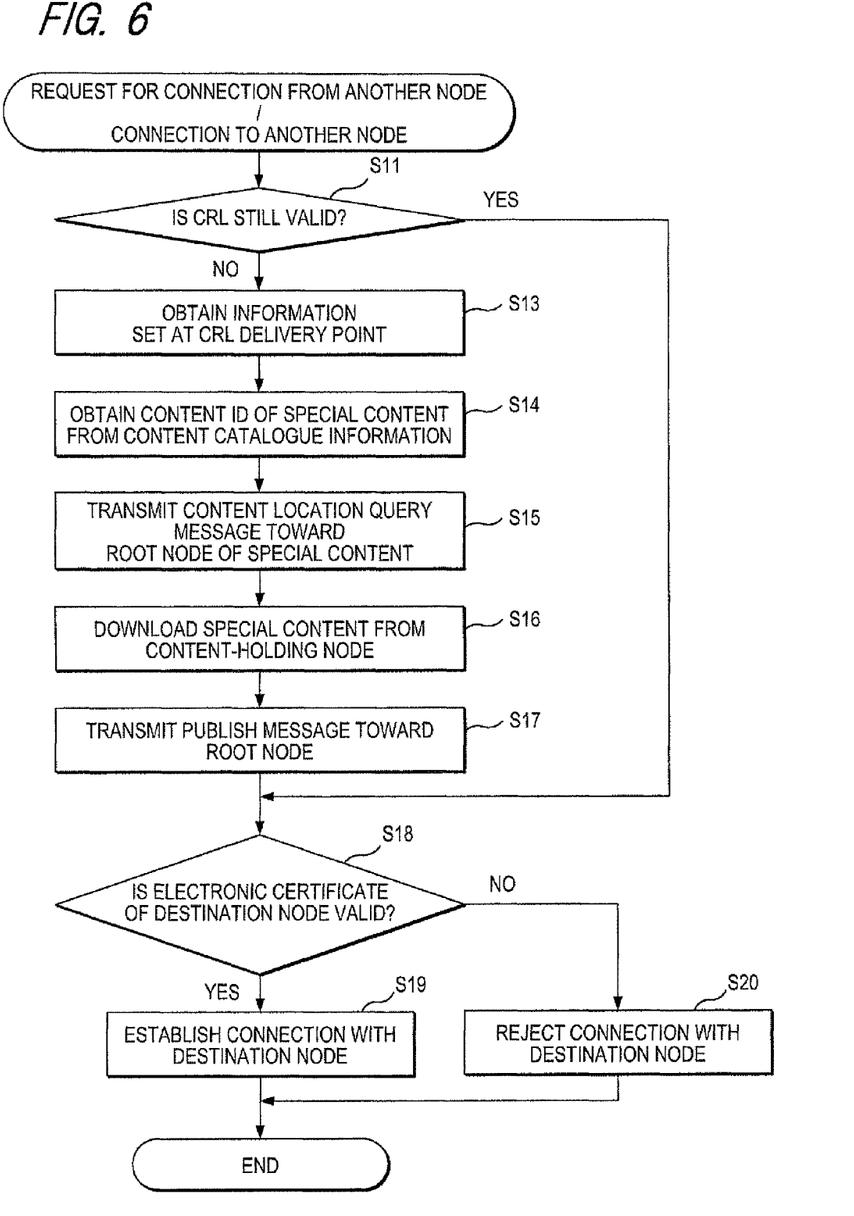
FIG. 6 is a flowchart showing example processing of the control unit in the node Nn of the first exemplary embodiment.

In order to establish, for example, predetermined communication (e.g., transmission and receipt of a replica of a content other than a special content, and the like) with another node Nn, processing shown in FIG. 6 is commenced when a request for connection is sent to the other node Nn or when a connection request is received from the other node Nn. As used herein, the term "predetermined communication" means, for example, transmission and receipt of a replica of a content other than the special content.

First, when obtained an electronic certificate from the destination node, the control unit 21 obtains a CRL corresponding to the electronic certificate from the CRLs stored in the storage unit 22. The control unit 21 determines whether or not the CRL has reached an expiry date (step S11). A determination may also be made, on the basis of a date and time for the next update provided in a CRL, as to whether or not an expiry date for the CRL is reached. A date and time of obtaining a CRL may also be recorded, and an expiry data may be determined to be reached when a given period of time (e.g., 24 hours, and the like) has elapsed since the date and time of obtaining the CRL. When the CRL has not yet reached its expiry date (YES in step S11), the control unit 21 proceeds to step S18.

When the CRL has already expired (NO in step S11), the control unit 21 obtains information set at a CRL delivery point of an electronic certificate obtained from the node at the other end (step S13). The control unit 21 searches for a content ID of the special content from the content catalogue information in accordance with the obtained information (step S14).

Next, the control unit 21 generates a content location query message including the obtained content ID and node information about the own node. The control unit 21 transmits the content location query message to the root node of the special content imparted with the special content ID (step S15). The control unit 21 thereby makes an access to the content-holding node storing the special content by use, for example, of the index information returned from the root node. An up-to-date CRL is obtained by downloading a special content from the content-holding node (step S16).

Next, the control unit 21 generates a publish message including a content ID of the downloaded special content and node information about the own node. The control unit 21 transmits the publish message toward the root node (step S17).

When the CRL is determined to be still valid in step S11 (YES in step S11) or when processing pertaining to step S17 is completed, the control unit 21 determines, on the basis of the CRL held in the own node or a newly-obtained CRL, whether or not the electronic certificate of the destination node is valid (step S18).

When the electronic certificate of the destination node is valid (YES in step 818), the control unit 21 performs connection processing for establishing encrypted communication with the destination node (step S19). Specifically, the control unit 21 establishes, for example, a secure connection with the destination node in accordance with a public key put in the electronic certificate of the destination node. The control unit 21 performs encrypted communication with the destination node and cancels the connection with the destination node when required communication is completed, whereupon processing is terminated.

In the meantime, when the electronic certificate of the destination node is not valid (NO in step S18), the control unit 21 transmits a connection rejection message, which shows rejection of a connection, to the destination node (step S20), thereby completing processing.

As mentioned above, according to this exemplary embodiment, the center server SA is configured so as to generate a special content including a CRL obtained from the authentication server CA; assign a unique content ID to the special content; and store the special content in a plurality of nodes Nn in a distributed manner. Each of the nodes Nn is configured so as to obtain the content ID assigned to the special content including a certificate revocation list corresponding to the electronic certificate in accordance with the obtained electronic certificate; and perform control so as to search for another node Nn that holds the special content in accordance with the content ID, thereby obtaining the special content from the other node Nn. Hence, load on the authentication server CA and the center server SA resulting from delivery of the certificate revocation list can be lessened.

Each of the nodes Nn makes a connection with the node Nn storing the special content, to thus obtain the special content, by sending a query to the root node managing the location of the special content. Consequently, the root node managing the location is determined for each special content by content IDs allocated to special contents, so that load resulting from management of locations of the special contents can be distributed.

When specifics of information included in the special content already stored in a distributed manner is updated, the center server SA is arranged so as to store a new special content including updated information in the plurality of nodes Nn in a distributed manner; assign a new unique content ID to the new special content; and make valid only a content ID of the new special content in each of the nodes Nn. Hence, it is possible to avoid each of the nodes Nn from uselessly obtaining an old special content.

(2. Second Exemplary Embodiment)

A second exemplary embodiment of the present invention will now be described with reference to FIGS. 7 and 8.

In the first exemplary embodiment, the root node related to the content ID of the special content manages the location of the special content. In the second exemplary embodiment to be described below, the root node holds the special content by itself.

In the first exemplary embodiment, every time a special content is newly generated by updating a CRL, a new content ID is imparted to the special content. In the second exemplary embodiment, a content ID identical with the content ID imparted to the yet-to-be-updated special content is imparted to a newly-generated special content. In the second exemplary embodiment, a content ID of the special content including a corresponding CRL is set at the CRL delivery point of the electronic certificate. Even when the CRL is updated, each of the nodes Nn can thereby obtain a special content including the latest CRL corresponding to the electronic certificate.

Since the content distribution storage system, the center server SA, and the nodes Nn of the second exemplary embodiment are the same as the content distribution storage system, the center server SA, and the nodes Nn of the first exemplary embodiment in terms of a configuration, their detailed explanations are omitted.

Figure 7:
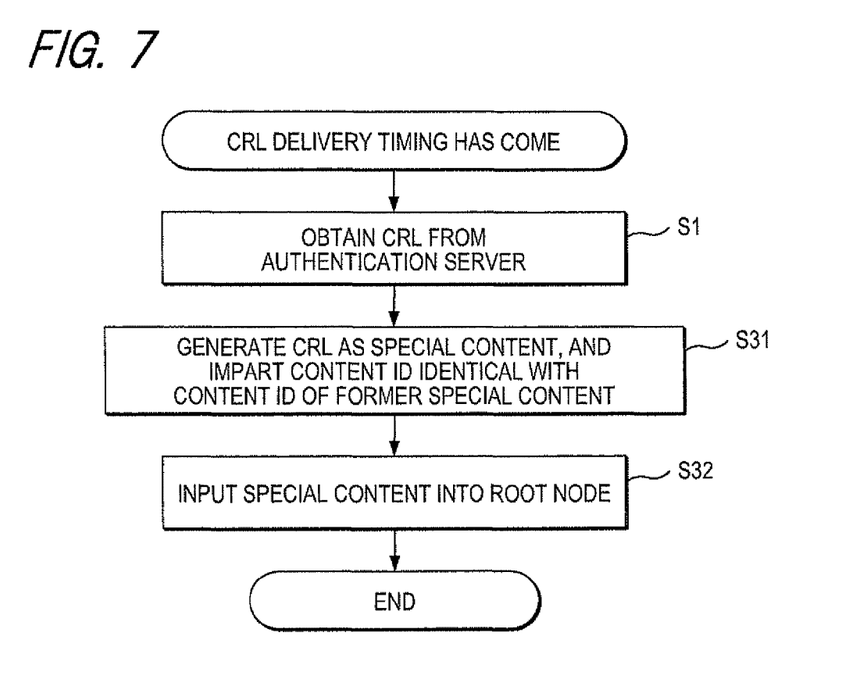
FIG. 7 is a flowchart showing example processing of the control unit in the center server of a second exemplary embodiment.

In FIG. 7, elements which are the same as those shown in FIG. 5 are assigned the same reference numerals. In FIG. 8, elements which are the same as those shown in FIG. 6 are assigned the same reference numerals.

As shown in FIG. 7, the control unit 11 of the center server SA obtains a CRL from the authentication server CA as in the case of the first exemplary embodiment (step S1).

Next, the control unit 11 generates a CRL as a special content. The control unit 21 imparts a special content generated this time with a content ID that is identical with the content ID of the former special content (step S31). The former special content is a special content including a yet-to-be-updated CRL that is identical in terms of the range of electronic certificate covered by the CRL.

Next, the control unit 11 searches for a node Nn associated with the imparted content ID; namely, the root node. The root node is a node Nn having a node ID closest to the imparted content ID. The control unit 11 inputs a generated special content to the root node (step S32). The control unit 11 terminates processing. When storing an existing special content imparted with a content ID identical with the imparted content ID, the root node received the special content deletes the existing special content. The root node stores a newly-received special content. At this time, the root node does not deliver a publish message.

Figure 8:
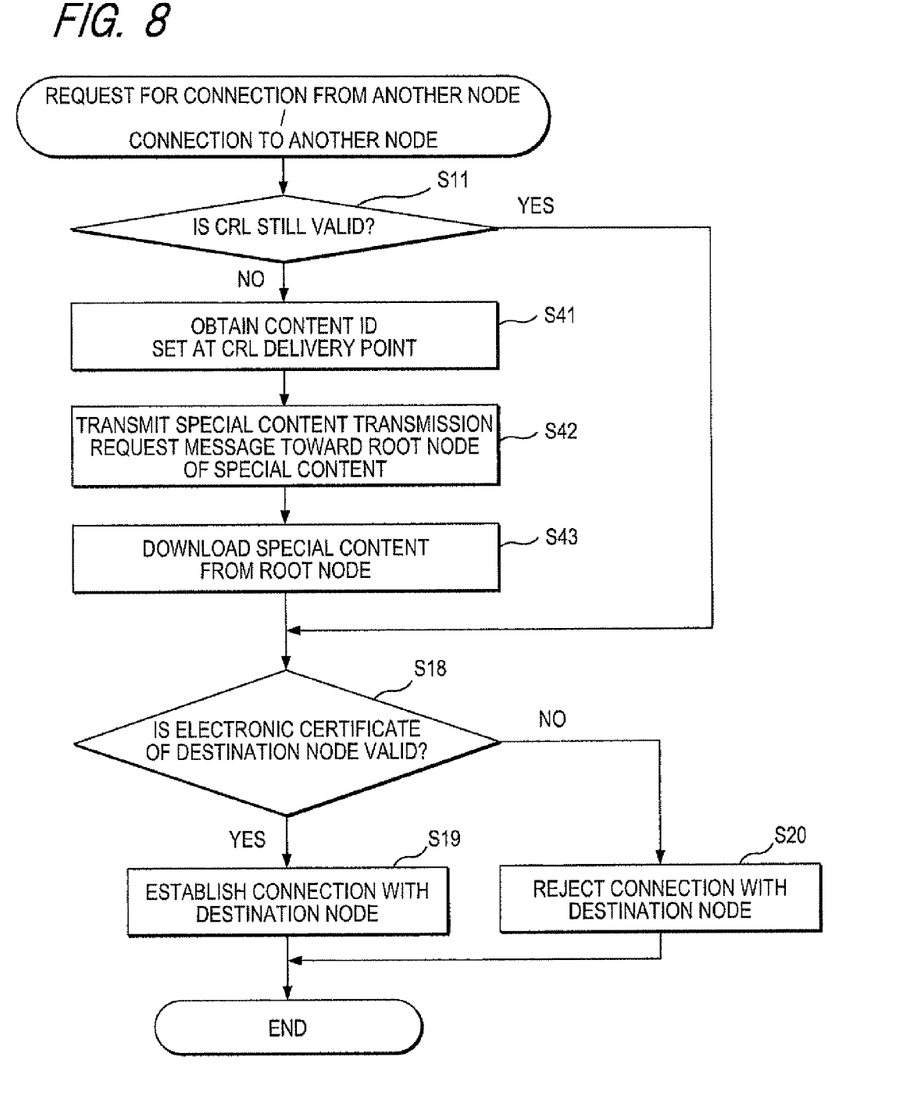
FIG. 8 is a flowchart showing example processing of the control unit in the node Nn of the second exemplary embodiment.

As shown in FIG. 8, the control unit 21 of the node Nn determines whether or not the CRL corresponding to the electronic certificate obtained from the destination node is still valid, as in the case of the first exemplary embodiment (step S11). When the CRL is still valid (YES in step S11), the control unit 21 proceeds to step S18. In contrast, when the CRL has already expired (NO in step S11), the control unit 21 proceeds to step S41.

The control unit 21 proceeded to step S41 obtains a content ID set at the CRL delivery point of the electronic certificate obtained from the destination node (step S41).

Next, the control unit 21 generates a special content transmission request message including the obtained content ID and node information about the node to which the control unit belongs. The special content transmission request message is example special content request information. In accordance with a routing table stored in the node itself, the control unit 21 transmits the special content transmission request message to another node Nn. Specifically, the control unit 21 transmits the special content transmission request message to the root node for the special content imparted with the content ID (step S42). Like the content location query message, the special content transmission request message is transferred to the root node by DHT routing taking the content ID as a key. Specifically, the root node is searched by DHT routing. The control unit 21 thereby receives the special content transmitted from the root node received the special content transmission request message. As mentioned above, the control unit 21 obtains the latest CRL (step S43). The control unit 21 does not transmit any publish message.

Next, the control unit 21 determines, on the basis of the obtained CRL, whether or not the electronic certificate of the destination node is valid. In accordance with a result of determination, the control unit 21 performs processing for establishing connection with the destination node or rejects a connection with the same (steps S18 to S20) and terminates processing.

In the second exemplary embodiment, only the root node holds the special content. However, a node Nn other than the root node may also hold a special content. In this case, a root node provided with an input of a special content transfers the special content, for example, to a node Nn adjacent to the root node itself, and the special content is stored in that node Nn. The adjacent node Nn is a node Nn having a node ID close to a node ID assigned to the root node. For example, the node Nn is a node Nn having a node ID whose value is greater than the node ID assigned to the root node and closest to the node ID and a node Nn having a node ID whose value is smaller than the node ID assigned to the root node and closest to the node ID. Every time a special content including an updated CRL is input, the root node updates the special content held by an adjacent node Nn. The special content transmission request message transmitted from the usernode is transferred toward the root node by DHT routing. Therefore, even when the root node is kept out of the content distribution storage system S for any reason, the user-node can obtain a special content from the adjacent node Nn received the special content transmission request message by a transfer operation.

According to the exemplified embodiments, the center server SA allows the root node, which is related to the content ID assigned to the special content, to store the special content containing the CRL. The node Nn obtains, based on the obtained electronic certificate, the content ID assigned to the special content containing the CRL corresponding to the obtained electronic certificate. The node Nn is controlled so as to search, based on the obtained content ID, the root node related to the obtained content ID. Accordingly, it is possible to reduce the load of the authentication server CA and/or the center server SA which is caused by the delivery of the CRL. Further, the root node holding the content is determined by the content ID of the special content. Accordingly, the loads of the nodes Nn can be distributed.

In the exemplary embodiments, the content distribution storage system of the present invention is applied to a P2P (peer-to-peer) system of so-called pure type utilizing a DHT. The present invention may also be applied to another P2P system. For example, in a P2P system of so-called hybrid type, such as a Napster, contents are stored in respective node devices in a distributed manner; however, locations of the contents are managed by a server. In such a system, for example, identification information, such as a search key, for searching for a CRL, is provided at a CRL delivery point of an electronic certificate in advance. The user node sends a query to the server by the identification information, and the server searches for the node that holds the special content by the search key. The server establishes connection between the user node and the content-holding node. The user node can thereby obtain a special content from the content-holding node. Further, there is a case where the server first causes respective node devices to store a special content including a CRL. In this case, for example, node devices to store a special content are randomly selected. In the second operation or subsequent operation; namely, when a special content including an updated CRL is stored, the special content is stored, in an updating manner, in the same node device where the special content was stored first time. Moreover, the sever unit also manages participation of a node device in the system or withdrawal of the node device from the system. Accordingly, when the number of node devices holding the special content is reduced, node devices to store the special content may also be added.

In the exemplary embodiments, a CRL used for authentication in the P2P system that stores ordinary contents in a distributed manner and delivers the same is stored in a distributed manner as a special content and delivered. The present invention may also be applied in such a way that a CRL used for another common authentication is stored in a distributed manner and delivered. For example, a client-server type system may also be applied to delivery of an ordinary content, and a P2P system may also be applied specifically to distribution storage and delivery of a CRL used for authentication at the time of delivery of a content.

Further, in the exemplary embodiments, the center server SA transmits the special content and the content catalogue information to the nodes, but it is not limited thereto. For example, two separated devices (two separated servers, two separated nodes, or one server and one node) may transmit the special content and the content catalogue information, respectively. Further, a node may transmit both the special content and the content catalogue information.

What is claimed is:

1. A content distribution storage system in which a plurality of node devices are connected via a network and are capable of transmitting and receiving a content to and from one another, the system comprising:
   a first transmission unit configured to transmit a special content to a first node device of the plurality of node devices, the special content comprising certificate revocation list information indicating a list of at least an invalid electronic certificate;
   a second transmission unit configured to transmit identification information for identifying the special content to a second node device of the plurality of node devices; and
   a third node device that is one of the plurality of node devices, the third node device comprising:
      a certificate obtaining unit configured to obtain an electronic certificate from a particular node device, the particular node device being one of the plurality of node devices, the electronic certificate being used to authenticate the particular node device;
      an identification information obtaining unit configured, based on the electronic certificate obtained by the certificate obtaining unit, to obtain the identification information of the special content comprising the certificate revocation list information corresponding to the electronic certificate obtained by the certificate obtaining unit, the identification information obtaining unit obtaining the identification information from one of the second node device and a node device to which the identification information is transferred from the second node device; and
      a special content obtaining unit configured to obtain the special content comprising the certificate revocation list information from one of the first node device and a node device which stores the special content associated with the identification information obtained by the identification information obtaining unit.

2. The content distribution storage system according to claim 1, comprising an information processing device that comprises the first transmission unit and the second transmission unit.

3. The content distribution storage system according to claim 2,
wherein the information processing device comprises:
a determination unit configured to determine whether the special content has been stored in the first node group; and
an updating unit configured, if the determination unit determines that the special content has been stored in one of the first node device and the node device that stores the special content associated with the identification information, to update the identification information of the special content determined as having been stored with a new identification information of the special content to be transmitted;
wherein the second transmission unit transmits the new identification information updated by the updating unit.

4. A node device connected to a plurality of other node devices via a network and capable of transmitting and receiving a content to and from the plurality of other node devices in a content distribution storage system, the node device comprising:
a certificate obtaining unit configured to obtain an electronic certificate from a particular node device, the particular node device being one of the plurality of other node devices, the electronic certificate being used to authenticate the particular node device;
an identification information obtaining unit configured, based on the electronic certificate obtained by the certificate obtaining unit, to obtain identification information of a special content comprising certificate revocation list information corresponding to the electronic certificate obtained by the certificate obtaining unit, from at least one node device of a first node group, the first node group comprising one or more node devices of the plurality of other node devices which store the identification information; and
a special content obtaining unit configured to obtain the special content comprising the certificate revocation list information from at least one node device of a second node group, the second node group comprising one or more node devices of the plurality of other node devices which store the special content associated with the identification information obtained by the identification information obtaining unit.

5. The node device according to claim 4, further comprising a location information obtaining unit configured to obtain location information of at least one node device of a second node group from a management device that manages a location of the special content, the second node group comprising one or more node devices of the plurality of other node devices which store the special content, wherein the special content obtaining unit accesses at least one node device of the second node group based on the location information obtained by the location information obtaining unit, and obtains the special content from the accessed node device of the second node group.

6. The node device according to claim 5, further comprising a transmission unit configured to transmit information for inquiring the location of the special content to the management device related to the identification information obtained by the identification information obtaining unit.

7. The node device according to claim 4, wherein the second node group comprises a first node device related to the identification information associated with the special content, and wherein the special content obtaining unit obtains the special content associated with the identification information obtained by the identification information obtaining unit from the first node device related to the identification information obtained by the identification information obtaining unit.

8. The node device according to claim 7, wherein the second node group comprises one or more second node devices other than the first node device, wherein said node device further comprises a request transmitting unit configured to transmit a specia content requesting information indicating a request for the special content toward the first node device, and wherein the special content obtaining unit obtains the special content from at least one of the second node devices which has received the special content requesting information.

9. The node device according to claim 4, wherein the certificate obtaining unit obtains the electronic certificate that comprises setting information in which at least one of the identification information and associated information associated with the identification information is set as a delivery point of the certificate revocation list, wherein the identification information obtaining unit obtains the identification information based on the delivery point set in the electronic certificate.

10. A non-transitory computer-readable storage medium that stores a computer-executable program, the program being installed in the computer contained in a node device, the node device being connected to a plurality of other node devices via a network and capable of transmitting and receiving a content to and from the plurality of other node devices in a content distribution storage system, the program comprising instructions for:
obtaining an electronic certificate from a particular node device, the particular node device being one of the plurality of other node devices, the electronic certificate being used to authenticate the particular node device;
obtaining, based on the obtained electronic certificate, identification information of a special content comprising certificate revocation list information corresponding to the obtained electronic certificate, from a node device of the plurality of other node devices which store the identification information; and
obtaining the special content comprising the certificate revocation list information from a node device of the plurality of other node devices which store the special content associated with the obtained identification information obtained.

11. A method for obtaining a content in a content distribution storage system in which a plurality of node devices are connected via a network and are capable of transmitting and receiving a content to and from one another, the method comprising:
transmitting a special content from a first transmission unit to a first node device of the plurality of node devices, the special content comprising certificate revocation list information indicating a list of at least an invalid electronic certificate; and
transmitting identification information for identifying the special content from a second transmission unit to a second node device of the plurality of node devices;

wherein the plurality of node devices comprises a third node device, the third node device performing the steps of:

obtaining an electronic certificate of a particular node device, the particular node device being one of the plurality of node devices, the electronic certificate being used to authenticate the particular node device;

obtaining, based on the obtained electronic certificate, the identification information of the special content comprising the certificate revocation list information corresponding to the obtained electronic certificate, the identification information being obtained from the one of the second node device and a node device to which the identification information is transferred from the second node device; and obtaining the special content comprising the certificate revocation list information from one of the first node device and a node device which stores the special content associated with the obtained identification information.

12. The content distribution storage system according to claim 1, wherein the third node device further includes an authenticate unit configured to authenticate the particular node deice by referring to the electronic certificate of the particular node device and the certificate revocation list information included in the special content obtained by the special content obtaining unit.

13. The node device according to claim 4, further comprising an authenticate unit configured to authenticate the particular node device by referring to the electronic certificate of the particular node device and the certificate revocation list information included in the special content obtained by the special content obtaining unit.

14. The non-transitory computer-readable storage medium according to claim 10, the program further comprising instructions for authenticating the particular node device by referring to the electronic certificate of the particular node device and the certificate revocation list information included in the special content obtained by the special content obtaining unit.

15. The method according to claim 11, further comprising authenticating the particular node device by referring to the electronic certificate of the particular node device and the certificate revocation list information included in the special content obtained by the special content obtaining unit.

16. The content distribution storage system according to claim 1, wherein the first node device and the node device which stores the special content associated with the identification information obtained by the identification information obtaining unit belong to a first node group, the second node device and the node device to which the identification information is transferred from the second node device belong to a second node group, and the third node device does not belong to the first node group and the second node group.

* * * * *